March 19, 1935.  R. THOMAS  1,994,841
WELDING TORCH MIXER
Filed Dec. 31, 1929
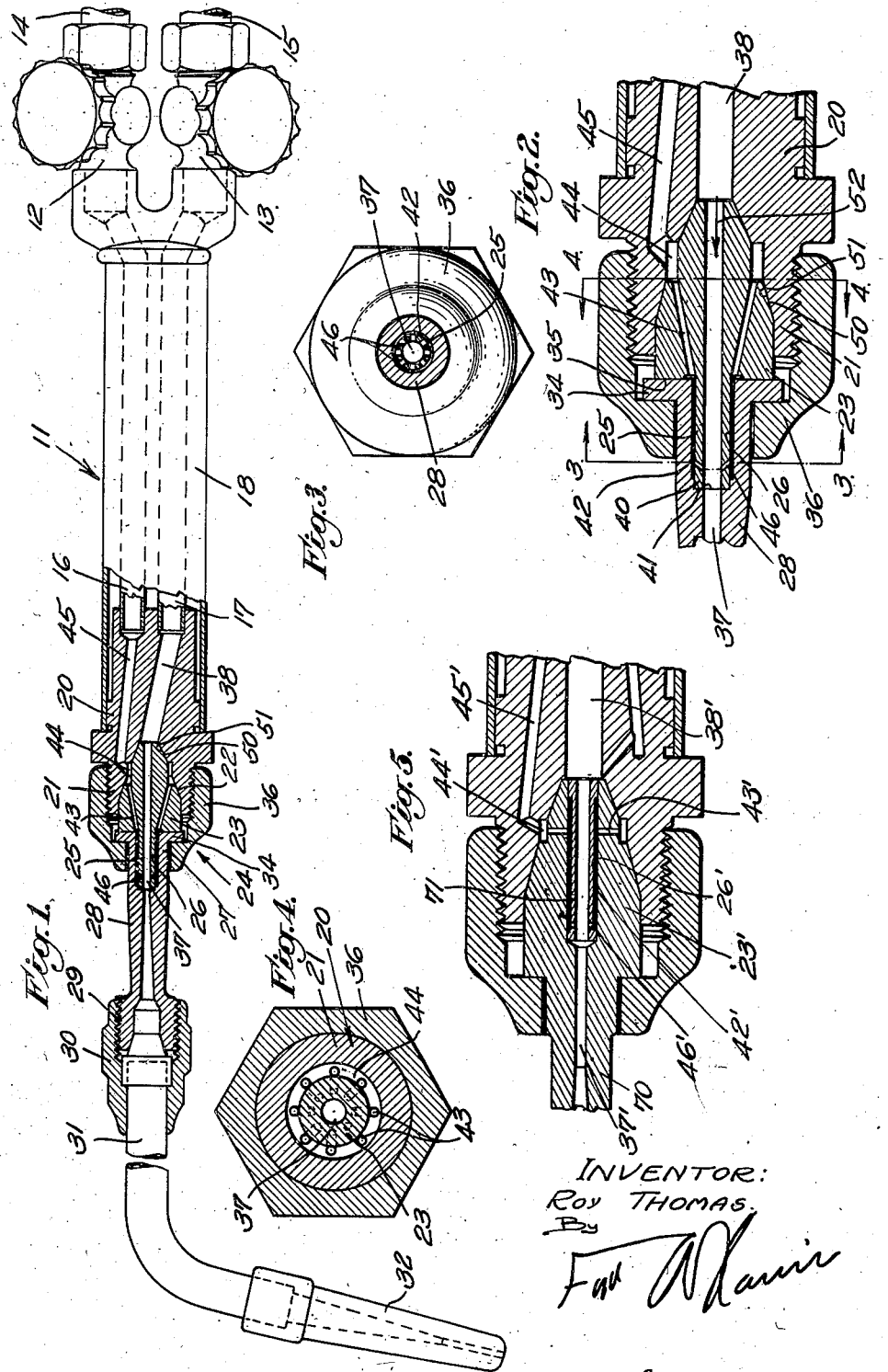
INVENTOR:
ROY THOMAS.
By
ATTORNEY.

Patented Mar. 19, 1935

1,994,841

UNITED STATES PATENT OFFICE 1,994,841

WELDING TORCH MIXER

Roy Thomas, Los Angeles, Calif., assignor to The Bastian-Blessing Company, Chicago, Ill., a corporation of Illinois Application December 31, 1929, Serial No. 417,672

5 Claims. (Cl. 158—27.4)

My invention relates to torches in which a combustible gas is mixed with a combustion supporting gas, such as oxygen, so as to produce a flame of extremely high temperature which may be employed for the fusion of metals or other high fusion point substances, and relates particularly to a mixer for the mixing of gases employed in a torch of the above character.

It is an object of the invention to provide a mixer capable of handling relatively large quantities of gases so that ample heat may be generated in the flame produced by the torch without liability of backfire carrying through the torch into hose members through which gases for operation of the torch are carried.

A further object of the invention is to provide a mixer so constructed that flash-back flames will be extinguished therein so that danger of the flash-back being carried into the hose is avoided.

A further object of the invention is to provide a mixer having a relatively large centralized gas passage and a surrounding oxygen passage having such formation that flash-back flames will be extinguished therein, this oxygen passage being connected with the gas passage in such a manner as to form jets having an injector action. By the use of my novel mixing construction, relatively low gas pressure may be employed, and a perfect mixture of the gases may yet be attained.

A further object of the invention is to provide a mixer so constructed as to extinguish flashback flames therein but being of such construction that the heat of such flash-back flames is rapidly dissipated so as to prevent rapid heating of the mixer parts to such degree that pre-ignition of the gas mixture will take place within the mixer.

Further objects and advantages of the invention will be made evident throughout the following part of the specification.

Referring to the drawing which is for illustrative purposes only,

Fig. 1 is a partly sectioned, elevational view of a welding torch employing a preferred form of my new mixer.

Fig. 2 is an enlarged fragmentary longitudinal section showing the details of the mixer construction.

Fig. 3 is a section on a plane represented by the line 3—3 of Fig. 2.

Fig. 4 is a section on a plane represented by the line 4—4 of Fig. 2.

Fig. 5 is a fragmentary section similar to Fig. 2 but showing an alternative form of my mixer.

In order to disclose the utility of my invention, I have shown in Fig. 1 a torch 11 having an oxygen valve 12 and an acetylene valve 13 adapted to be connected respectively with hose members 14 and 15 and with tubes 16 and 17 within the handle 18 of the torch 11, through which tubes the oxygen and acetylene are carried to a head fixture 20 at the front end of the handle. The outer end of the fixture 20 is in the form of a threaded projection 21 and has an outwardly diverging conical recess 22 therein adapted to receive the plug portion 23 forming part of my new mixer 24, which plug portion 23 is provided with a tubular wall 25 adapted to extend into a counterbore 26 in a relatively outer wall 27 forming part of a stem or extension 28 which is threaded at 29 so that, by means of a nut 30, an extension or neck member, such as indicated at 31, may be secured thereto. In the illustration of the torch I have shown a welding tip 32 secured to the downwardly bent end of the member 31.

As best shown in Fig. 2, the extension 28 is provided with a flange 34 at its inner end which engages the outer radial face 35 of the plug 23 and is engaged by a nut 36 which screws upon the threaded projection 21 of the head 20, in such a manner as to hold the plug 23 and the stem 28 in their respective positions of operation. The annular walls formed by the members 28 and 23 enclose an axial gas passage 37 which communicates at its rearward end with a passage 38 which in turn connects with the gas delivery tube 17.

The tubular wall 25 of the plug 23 has the form of a relatively thin walled tube and is of such external diameter that its front end 40 will closely fit a secondary counterbore 41 situated at the inner end of the counterbore 26. The diameter of the counterbore 26 is of such magnitude that an annular oxygen passage or space 42 is formed between the inner wall consisting of the tubular wall 25 and the outer wall formed by the inner end of the stem 28, this annular space being of greater length than its mean diameter, being connected through a plurality of diagonally drilled holes 43 with an annular space 44 which is connected through an oxygen passage 45 in the head 20 with the oxygen delivery tube 16, and having its forward end communicating with the gas passage 37 through forwardly and inwardly directed holes 46. The annular space 44 is formed half within the conical surface 50 of the plug 23 and half within the conical surface 51 of the recess 22, this being accomplished by cutting cooperating grooves in the surfaces 50 and 51 of the members 23 and 22 in substantially the manner shown.

A feature of my new mixer construction is that the gas passage 37 is centralized and is in alignment with the gas passage 38, this being contrary to customary construction, which employs a centralized oxygen passage through which the oxygen is fed under pressure and to which flow of oxygen the combustible gas, preferably acetylene, is fed through diagonal jet openings. My new construction permits a relatively large quantity of gas to flow through the passage 37, as indicated by the arrow 52 of Fig. 2, this gas passing on through the torch structure to the tip 32 thereof. Oxygen for supporting combustion in the gas passes through the passage 45 into the annular space 44, from whence it then passes through a plurality of holes 43 into the annular space 42 wherein it passes forwardly to the front end of the space 42 and then passes diagonally and forwardly into the flow of gas within the passage 37, intermixing therein with the gas and accomplishing an injector effect in forward direction which increases the velocity of the gas and oxygen mixture toward the tip 32 of the torch.

When flash-back occurs, the flame travels rapidly back through the neck 31 of the extension 28 to the mixer 24, wherein the flash-back flame divides, a part thereof carrying rearwardly within the passage 37 toward the passage 38, and the remaining portion thereof carrying through the jet openings 46 into the annular space 42, wherein it is extinguished. When flash-back occurs, a small amount of flame is carried back within the passage 37 beyond the position of the oxygen openings 46, carrying therewith a small amount of oxygen which rapidly intermixes with the combustible gas so that a mixture is formed containing insufficient oxygen to support combustion, the result being that that portion of the flash-back which carries back in the passage 37 toward, and possibly into, the passage 38 immediately burns out, or, in other words, is extinguished. The flash-back flame which passes through the openings 46 into the space 42 containing pure oxygen carries therewith a small amount of combustible gas which, under ordinary circumstances, will burn completely in the presence of oxygen but which in my improved construction is extinguished in the space 42.

Although the theory of this extinguishing operation has not been definitely proven and therefore may be partly incorrect, I believe that the very effectual flash-back extinguishing results are accomplished in what I desire to term the extinguishing space 42, due to the characteristic and peculiar formation of this space 42. It will be noted that the radial height or thickness of the annular space 42, or, in other words, the distance between the outer surface of the tubular wall 25 and the inner surface of the member 28 forming the counterbore 26, is very small. In other words, it is just sufficient to provide sufficient area for passage of all of the oxygen which may be forced under pressure through the jet openings 46. It will be recognized, therefore, that the radial height of the passage 42 may be made considerably less than the diameter of the openings 46 and yet maintain therein an area of cross section equal to the cumulative area of the openings 46. It is believed that when the oxygen side of the flash-back flame enters the space 42, it is flattened out in the small space thereby provided, and its heat is absorbed by the large area of wall surface presented to the space 42, the result being that the combustion cannot be then further supported. In ordinary torch construction, the thickness of the gas passage 42 may be made equivalent to 1/64 of an inch, and the diameter of the drill employed for drilling the jet openings 46 may be from two to five times the thickness of the passage 42, depending upon the number of jet openings 46 employed. By leading the oxygen to the jet openings 46 through an oxygen passage of relatively small height or thickness and of correspondingly large width, I am enabled to form a passage through which combustion will not carry, in this manner effectually extinguishing flash-back which might otherwise carry into the oxygen passages of the torch and into the oxygen hose member 14. The inner wall of the extinguishing passage 42 formed by the tubular wall 25 is connected directly to the body of the plug 23 and is preferably formed from copper. The heat of the flash-back flame is very quickly dissipated through the member 23 and those portions of the head 20 with which it engages and is further dissipated through the outer annular wall of the extension 28 surrounding the counterbore 26. The rapid dissipation of heat due to this construction prevents heating of the mixing construction to such a degree that pre-ignition will take place within the torch. Therefore, by use of my new mixer I am enabled to substantially eliminate the very undesirable rapid fire flash-back action encountered in the use of many welding torches of standard construction.

In the illustrations I have shown preferred proportions of the extinguishing passage 42 and the openings 43 and 46. These proportions may be varied within reasonable limits to suit the pressure and quantity of oxygen necessary to produce perfect combustion of the combustible gas employed by the torch. For instance, in torches of extremely large size, the central passage 37 will be increased and the mean diameter of the extinguishing passage 42 will likewise be increased so that a corresponding increase in area may be obtained therein. The length of the passage 42 and its thickness may also be varied in accordance with existing conditions without departing from the valuable features of construction of the invention.

In the alternative form of my invention shown in Fig. 5, an extinguishing space 42' is formed within the counterbore 26' at the inner end of an extension member 70 by use of a thin walled tube or sleeve 71 having its circumferential portion turned down to reduced diameter intermediate its ends. In this alternative construction, the extension is formed integrally with a plug 23' instead of the plug being made separately, in the manner indicated at 23 in Fig. 2. The combustible gas is carried in a direct line of flow from a gas passage 38' into the gas passage 37' formed by the member 70 and the inserted tube 71. The oxygen is conducted through an eccentrically disposed oxygen passage 45' into an annular space 44' and is from this space 44' conducted into the extinguishing space 42' through radially drilled holes 43' which communicate with the extinguishing space 42' near its inner or rearward end. In this form of the invention radial jet openings 46' are shown communicating between the extinguishing passage 42' and the passage 37', it being found that the non-flash-back characteristics of my new construction are not affected by the angle at which the jet openings 46' or the entrance opening 44' are drilled.

Although I have herein shown my invention in simple and practical forms, it is recognized that certain parts or elements thereof are representative of other parts, elements, or mechanisms which may be employed in substantially the same manner to accomplish substantially the same results; therefore, it is to be understood that the invention is not to be limited to the details disclosed herein but shall have the scope of the following claims.

I claim as my invention:

1. A mixer construction for a torch, including: an extension member having a gas passage; means for securing said extension member to the adjacent part of said torch; and a body member held in said adjacent part by said extension member, said body member having an axially projecting portion extending into said gas passage so as to form an annular chamber between said portion and said extension member and an axial passage connecting said gas passage with a gas source in the adjacent part, said portion having jet openings connecting said chamber with said axial passage, said body member having a plurality of oxygen delivery passages formed therein communicating with an oxygen source in the adjacent part and leading into said chamber at a point axially offset from said jet openings.

2. A mixer construction for a torch, including: an extension member having a gas passage; means for securing said extension member to the adjacent part of said tourch; and a body member held in said adjacent part by said extension member, said body member having an axially projecting portion extending into said gas passage so as to form an annular chamber between said portion and said extension member, and an axial passage connecting said gas passage with a gas source in the adjacent part, said oxygen chamber being of small radial thickness and of greater axial length for extinguishment of a flash-back flame therein, and said portion having jet openings connecting said chamber with said axial passage, said body member having a plurality of oxygen delivery passages formed therein communicating with an oxygen source and leading into said chamber at a point axially offset from said jet openings.

3. A mixer construction for use with a torch handle having in one end a recess and having an oxygen passage and a central gas passage communicating with said recess, including: a member disposed in said recess having a gas passage therethrough registering with the gas passage of said torch handle; an extension having a passage therethrough and an enlarged end portion disposed around a portion of said member and defining with said member an annular oxygen chamber surrounding the gas passage, said portion of said member having jet openings connecting said annular oxygen chamber to said gas passage in said member, and said member having a supply passage connecting said annular oxygen chamber to said oxygen passage in said handle; and a retaining member attached to the end of said handle and securing said member and said extension to said handle.

4. A mixer construction for a torch, including: an extension member incorporated in a torch and having therein a gas passage; means for securing said extension member to said torch; a body member associated with said torch having therein a passage communicating with said gas passage and having an extension fitting into said gas passage and with said extension member defining an annular oxygen chamber, said extension having jet openings therein inclined relative to the axis of said gas passage and connecting said oxygen chamber and said passage, said body member having therein an oxygen delivery passage communicating with said oxygen chamber at a point axially spaced from said jet openings.

5. In a torch in which two gases are mixed to provide a combustible mixture, said torch having two gas passages, the combination of: a member having a central opening extending therethrough and communicating with one of said passages to allow gas flowing through said passage to also flow through said opening; and an outer member having a gas passage terminating in a cavity into which said member projects said cavity being of such size and the exterior of said member being of such a character as to form an annular space around said member, said member being provided with a second opening through which gas from the other of said passages is delivered to said annular space, said member being provided with a small hole connecting said first mentioned opening and said space.

ROY THOMAS.